United States Patent
Ingraham, I et al.

(10) Patent No.: US 9,808,878 B2
(45) Date of Patent: Nov. 7, 2017

(54) ROBOTIC WELDING EQUIPMENT STATION

(71) Applicants: Jeffrey R. Ingraham, I, Cary, IL (US); Kristofer K. Klein, Glen Ellyn, IL (US)

(72) Inventors: Jeffrey R. Ingraham, I, Cary, IL (US); Kristofer K. Klein, Glen Ellyn, IL (US)

(73) Assignee: Praxair Technology, Inc., Danbury, CT (US)

( * ) Notice: Subject to any disclaimer, the term of this patent is extended or adjusted under 35 U.S.C. 154(b) by 512 days.

(21) Appl. No.: 14/264,729

(22) Filed: Apr. 29, 2014

(65) Prior Publication Data

US 2014/0319110 A1 Oct. 30, 2014

Related U.S. Application Data

(60) Provisional application No. 61/817,522, filed on Apr. 30, 2013.

(51) Int. Cl.
*B23K 9/10* (2006.01)
*G06F 19/00* (2011.01)
(Continued)

(52) U.S. Cl.
CPC .............. *B23K 9/095* (2013.01); *B23K 9/173* (2013.01); *B23K 9/32* (2013.01); *B23K 31/12* (2013.01);
(Continued)

(58) Field of Classification Search
CPC .... B23K 31/12; B23K 37/0235; B23K 9/095; B23K 9/173; B23K 9/32; Y10S 901/42; Y10S 901/47
(Continued)

(56) References Cited

U.S. PATENT DOCUMENTS 3,858,025 A * 12/1974 Sidbeck ............... B23K 9/0256
219/124.34
3,939,323 A 2/1976 Meehan et al.
(Continued)

FOREIGN PATENT DOCUMENTS

EP 0 278 330 A1 8/1988
JP 57181768 A * 11/1982 ............... B23K 9/12
WO WO 2010061422 A1 * 6/2010 ............. B23K 9/091

OTHER PUBLICATIONS

Beom-Sahng Ryuh et al., "Arc Welding Robot Automation Systems", pp. 595-608, Industrial Robotics: Programming, Simulation and Application, ISBN 3-86611-286-6, pp. 702, ARS/pIV, Germany, Dec. 2006, Edited by Low Kin Huat.

*Primary Examiner* — Quang D Thanh
*Assistant Examiner* — Ket D Dang
(74) *Attorney, Agent, or Firm* — Salvatore Pace

(57) ABSTRACT

A robotic welding equipment station to detect deviation of a tool center point of a welding torch. The station is provided with pairs of light emitting and detecting devices to emit and detect two separate light beams. The pairs of light emitting devices and detectors are oriented at an angle and spaced apart from each other such that the two light beams are at an angle to one another and the weld wire electrode is able to simultaneously interrupt both light beams when there is no deviation in a tool center point. The spacing prevents the weld wire electrode from interrupting both light beams when an increasing deviation of the tool center point propagates along the length of the weld wire electrode. First and second output signals generated by the first and second light detectors are received by a means for detecting deviation of the tool center point.

14 Claims, 2 Drawing Sheets

(51) Int. Cl.
*B23K 9/095* (2006.01)
*B23K 9/173* (2006.01)
*B23K 9/32* (2006.01)
*B23K 37/02* (2006.01)
*B23K 31/12* (2006.01)

(52) U.S. Cl.
CPC ......... *B23K 37/0235* (2013.01); *Y10S 901/42* (2013.01); *Y10S 901/47* (2013.01)

(58) Field of Classification Search
USPC ........ 219/130.01, 54, 214.34, 125.1, 124.34, 219/125.11; 901/47, 42; 700/245, 246, 700/250, 252, 257, 258, 262, 264; 701/23; 362/119, 120, 89, 253, 293, 362/235–237, 800, 311; 33/252, 293, 33/503, 520; 250/200, 216, 208.1, 208.2, 250/208.6, 224, 559.19; 364/571.01
See application file for complete search history.

(56) References Cited

U.S. PATENT DOCUMENTS

| | | | | |
|---|---|---|---|---|
| 5,329,092 A | * | 7/1994 | Weaver | B23K 9/122 219/124.34 |
| 5,906,761 A | * | 5/1999 | Gilliland | B25J 9/1671 219/124.33 |
| 6,352,354 B1 | * | 3/2002 | Boillot | B23K 9/127 219/124.34 |
| 2006/0138116 A1 | * | 6/2006 | Lipnevicius | B23K 9/124 219/137.71 |
| 2010/0140240 A1 | * | 6/2010 | Turner | B23K 9/127 219/124.4 |

\* cited by examiner

ROBOTIC WELDING EQUIPMENT STATION

CROSS REFERENCE TO RELATED APPLICATION

The present application claims priority from U.S. Application Ser. No. 61/817,522, filed Apr. 30, 2013, which is incorporated by reference herein in its entirety.

FIELD OF THE INVENTION

The present invention relates to a robotic gas metal arc welding equipment station to detect deviation of a tool center point of a welding torch having an electric arc welding tip and a weld wire electrode projecting from the welding tip in which deviation of the tool center point is detected through lack of simultaneous interception of two light beams, oriented at right angles to one another, by the weld wire electrode. More particularly, the present invention related to such a robotic welding equipment station in which pairs of light emitting and detecting devices are spaced apart from one another so that deviations in the tool center point occasioned by increasing misalignment of the weld wire electrode propagating along the length thereof are able to be detected.

BACKGROUND OF THE INVENTION

Metallic work pieces are joined by a variety of welding processes in which a joint is formed by melting the work pieces and adding a filler material to form a molten pool that cools to form a juncture of increased strength as compared with the strength of the work pieces being joined. One such process that is used in many industrial applications where speed of fabrication is desired is known as gas shielded metal arc welding "GMAW", also known as inert gas metal welding "MIG". In this process, robotic welding equipment is used in which the motion of a welding torch is controlled by a programmable controller. The welding torch has a gas shroud containing an electric arc welding tip from which a weld wire electrode projects. An electric arc is produced between the weld wire electrode and the work piece to locally melt the work piece while at the same time; the weld wire electrode is consumed as the filler material. A shielding gas is introduced through the gas shroud to protect the welding area from oxygen and nitrogen in the air that can cause defects in the weld such as porosity and weld embrittlement.

As mentioned above, motion of the welding torch is controlled automatically. This automatic control is dependent upon there being an alignment, namely a straight line, made by the weld wire electrode, the electric arc welding tip and the body of the torch. In more concrete terms, the motion of the torch is controlled relative to a tool center point, also known in the art as a tool control point, through which the weld wire electrode passes. Unfortunately, misalignment within the welding torch can occur due to robot crashes and wear within the electric arc welding tip. Another cause of misalignment is a cast produced within the weld wire electrode itself The weld wire electrode is consumable and therefore, it is supplied to the welding tip by means of a spool of wire. The spool can produce residual stresses that cause the wire to slightly curve as it is dispensed from the electric arc welding tip. All of these sources of misalignment can produce a deviation in the tool center point from weld to weld. As a result, while the programmed motion of the welding torch will not change, the actual position of the weld wire electrode will change to produce weld defects within work pieces to be joined.

In the prior art, in order to automatically detect deviations in the tool center point, a welding equipment station can be provided. Within such station, a contact gage may be provided where the wire touches the gage to ensure properly alignment of the tool center point. Additionally, there are non-contact types of gages in which intersecting light beams are used to test for the presence of the weld wire electrode and thereby verify that the weld wire is at the tool center point. The indication provided by either of these gages allows the operator to suspend operations and perform any necessary maintenance to the welding torch. For example, such maintenance can include replacement of a worn electric arc welding tip so that the weld wire electrode will be at the tool center point when the maintenance is completed. A searching capability can be built into robotic welding equipment using a non-contact type of gage in which after a tool center point test is failed, a search pattern is performed through automated motion of the torch relative to the light beams to measure the actual offset from the tool center point. Such measurement can be used to enable operators to decide whether operations can safely continue with the measured degree of offset or in a manner incorporating a compensation for the offset.

The problem with gages, is that sometimes slight deviations of the tool center point that arise from misalignments of the weld wire electrode that propagate along the length of the weld wire will be missed. As will be discussed, the present invention, among other advantages, provides a robotic welding equipment station that is capable, at low cost, of detecting deviations of the tool center point that arise from such propagating misalignments in a very simple, direct manner.

SUMMARY OF THE INVENTION

The present invention provides a robotic welding equipment station to detect deviation of a tool center point of a welding torch having an electric arc welding tip and a weld wire electrode projecting from the electric arc welding tip. The robotic welding equipment station has a first light emitting device to emit a first light beam and a first light detector positioned to detect the first light beam. A second light emitting device is also provided to emit a second light beam and a second light detector positioned to detect the second light beam. The first light emitting device and the first light detector oriented with respect to the second light emitting device and the second light detector such that the first light beam and the second light beam are at an angle to one another and the weld wire electrode is able to simultaneously pass through and interrupt both the first light beam and the second light beam when there is no deviation in a tool center point. Additionally, the first light emitting device and the first light detector spaced apart from the second light emitting device and the second light detector such that the first light beam and the second light beam are spaced apart from one another and the weld wire electrode will be unable to simultaneously pass through and interrupt both the first light beam and the second light beam upon a deviation of the tool center point occasioned by an increasing misalignment of the of the weld wire electrode propagating along the length thereof. The first light detector is configured to generate a first output signal when said first light beam is detected by the first light detector and the second light detector configured to generate a second output signal when the second light beam is detected by the second light detector. The first output signal and the second output signal capable of being received by means for detecting deviation of the tool center point.

The first light emitting device can be located opposite to the first light detector and the second light emitting device can be located opposite to the second light detector. Each of the first light emitting device and the first light detector and the second light emitting device and the second light detector is formed by a fiber optic light emission device and a matched fiber optic extrinsic sensor. Each of the fiber optic light emission device and the matched fiber optic extrinsic sensor can employ fiber optic elements having a diameter of about 0.5 millimeters. The first light emitting device and the first light detector can be spaced apart from the second light emitting device and the second light detector such that the first light beam and the second light beam are spaced apart from one another at a distance of about 6.35 millimeters. The fiber optic light emission device and the matched fiber optic extrinsic sensor of each of the first light emitting device and the first light detector and the second light emitting device and the second light detector can be mounted on a tube through which the weld wire electrode extends. The tube is mounted within an enclosure having an end wall and an opening within the end wall aligned with the tube and able to receive a gas shroud of the welding torch. The deviation detection means can be a programmable computer used in controlling welding operations of the welding torch that is responsive to the first output signal and the second output signal and programmed to suspend the welding operations upon an occurrence in a deviation in the tool center point of the welding torch and to display an indication thereof.

BRIEF DESCRIPTION OF THE DRAWINGS

While the specification concludes with claims distinctly pointing out the subject matter that Applicants regard as their invention, it is believed that the invention will be understood when taken in connection with the accompanying drawings in which:

DETAILED DESCRIPTION

Figure 1:
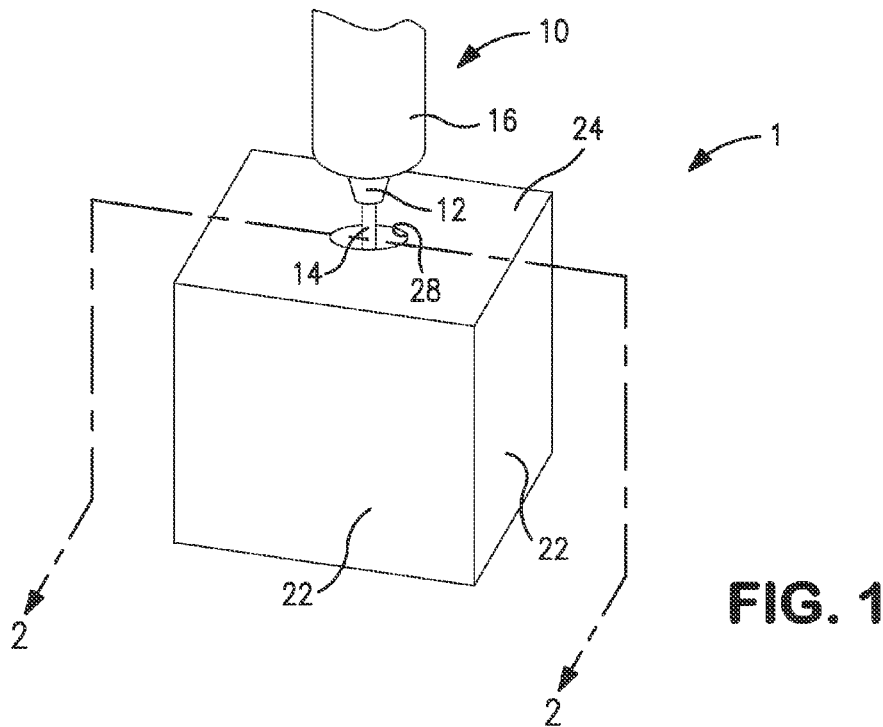
FIG. 1 is a perspective view of a robotic welding equipment station in accordance with the present invention.

With reference to FIG. 1, a robotic welding equipment station 1 is shown to detect deviation of a tool center point of a welding torch 10. Welding torch 10 is automatically controlled by known equipment not shown. Such equipment, including welding torch 10, can be obtained from Miller Weld Automation, 281 E. Lies Road, Carol Stream, Ill. 60118. Briefly, the motion of the welding torch 10 is able to be controlled by such equipment by accessing a control program associated with such equipment and then manually moving the welding torch 10 between start and end positions where the weld is to be made to join work pieces together. Welding torch 10 has a welding tip 12 and a weld wire electrode 14 projecting from the welding tip. A gas shroud 16 provides a shielding gas during welding operations.

Figure 2:
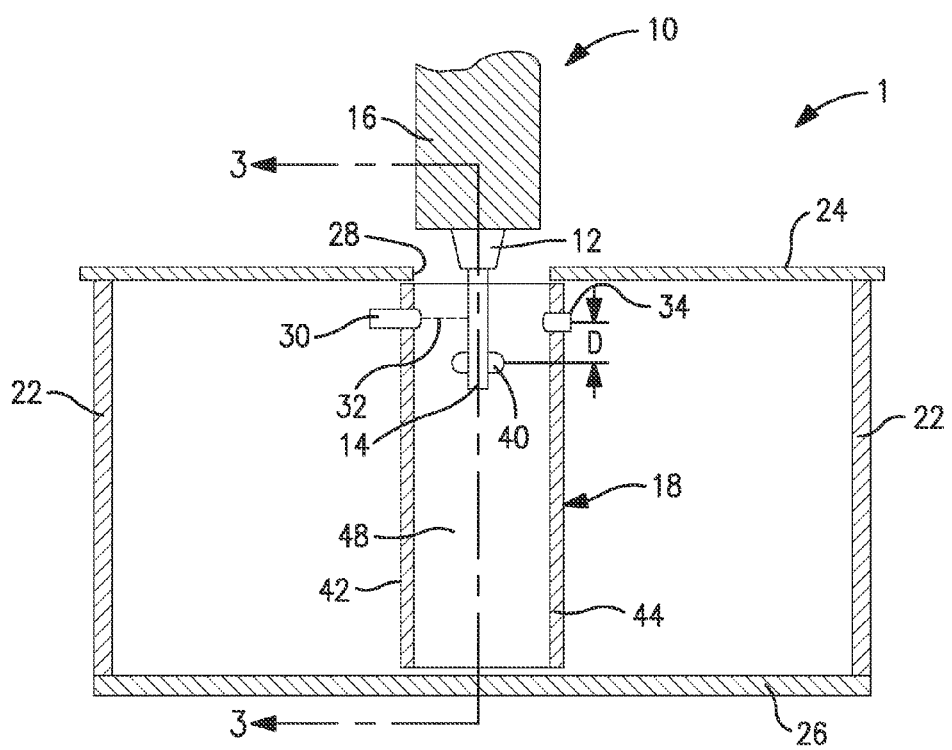
FIG. 2, is an enlarged schematic, sectional view of FIG. 1 taken along line 2-2 of FIG. 1.

With additional reference to FIG. 2, the sensing equipment is mounted on a tube 18 that can in turn be mounted within an enclosure 20. The enclosure 20 has side and top and bottom walls 22, 24 and 26, respectively. The top wall 24 has an opening 28 through which the weld wire electrode 14 can be extended when deviation of the tool center point is to be tested. In this regard, the control program of the automated equipment could be controlled to automatically position welding torch 10 at the beginning of each welding operation so that the tool center point can be tested. Although both the tube 18 and the enclosure 20 have a rectangular cross-section, as could be understood, other configurations are possible, for instance, circular tube-like structures. Further, enclosure 20 is optional in that it is only present to protect the sensing equipment contained within enclosure 20 from dust and debris.

Figure 3:
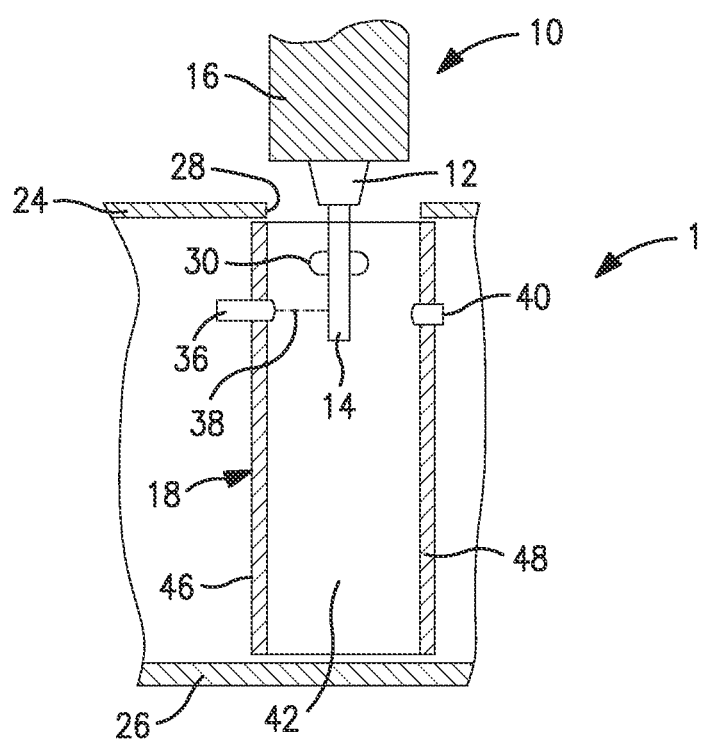
FIG. 3 is a fragmentary, sectional view of FIG. 2 taken along line 3-3 of FIG. 2.

With further reference to FIG. 3, the sensing equipment is a first light emitting device 30 to emit a first light beam 32 and a first light detector 34 positioned to detect the first light beam 32. Additionally, a second light emitting device 36 is provided to emit a second light beam 38 and a second light detector 40 is positioned to detect the second light beam. Preferably, each of the first and light emitting devices 30 and 36 is the fiber optic light emission devices by which narrow light beams 32 and 38 are emitted and each of the first and second light detectors 38 and 40 are matched fiber optic extrinsic sensors. These are known photoelectric sensors that can be obtained from Automation Direct of 3505 Hutchinson Road, Cumming, Ga. 30040. Preferably, the fiber optic components emit light beams of about 0.5 millimeters in thickness to sense the presence of weld wire electrodes 14 that are typically 0.035" and 0.045" in thickness. Since, these devices are not lasers, the emitting and detecting devices are positioned opposite to one another. However, if laser beam emitting devices were used, then mirrors could deflect the light beams to suitable detectors which would not necessarily be positioned opposite to such light emitting devices.

The use of a square cross-section form of tube 18 allows first light emitting device 30 to be mounted on sidewall 42 and first light detecting device 34 to be mounted on opposed sidewall 44. Similarly, second light emitting device 36 can be mounted on sidewall 46 and second light detecting device can be mounted on sidewall 48. Since the sidewalls 42, 44 and 46, 48 are at right angles to one another, the first light emitting device 30, the first light detector 34 and the light beam 32 are oriented at right angles to second light emitting device 36, second light detector 40 and second light beam 38. When there is no deviation of the tool center point, the weld wire electrode 14 is able to pass through both light beams 32 and 38 simultaneously and thereby interrupt the light beams and prevent the same from being detected by the first and second light detectors 34 and 40. If FIGS. 2 and 3 are compared, it can also be seen that the first light emitting device 30 and first light detecting device 34 are mounted on the tube 18 at a spacing or distance "D" from second light emitting device 36 and second light detecting device 40. When there exists a deviation of the tool center point occasioned by an increasing misalignment of the weld wire electrode 14 propagating along the length thereof, the weld wire electrode 14 will be unable to simultaneously pass through and interrupt both the first light beam and the second light beam. For example, as would be known by those skilled in the art, the weld wire is fed to the torch 10 by means of an automated spool. As the wire is consumed, the radius of the wire on the spool decreases and therefore, the degree of locked in stress in the wire increases resulting in a cast or curvature of the wire as it is fed to welding tip 12. As a result, there can be a slight curvature of the weld wire electrode 14 that would be missed if the first and second light emitting devices and detectors 30; 34 and 36; 40, respectively were all mounted in a single plane. As such, the robotic welding equipment station is able to detect deviations from the tool center point without provision of complex, if not expensive, software and equipment.

As can be appreciated, it is not necessary that a right angle design be incorporated for the orientation of first light emitting device 30, the first light detector 34 and the light beam 32 and the second light emitting device 36, second light detector 40 and second light beam 38. A more acute or obtuse angle could be used provided that the weld wire electrode 14 were able to interrupt both light beams when no deviation from the tool center point exists. Further, preferably for weld wire electrodes 14 of between 0.035" or 0.045", preferably the spacing "D" is about 6.35 millimeters.

It is to be further mentioned that when there exists a deviation in the tool center point, then weld wire electrode 14 will not interrupt the light beams 32 and/or 38. This will result in the light beams 32 and/or 38 to be detected by the first and second light detectors 34 and/or 40 which will in turn generate first and second electrical output signals, respectively. In this regard, in the illustrated embodiment, the detectors are fiber optic elements connected to photocells which will generate a slight current when exposed to the light beams. These first and second electrical output signals are fed into a means for detecting deviation of the tool center point. These means could simply be a simple Boolean logic circuit that would light an indicator light when either of such signals was received to allow equipment operators to suspend the welding operation and inspect the torch 10. However, in most automated welding equipment excess input ports are provided in the controller and the control program is capable of automatically responding to either or both of the first and second electrical signals in a manner known in the art to automatically suspend welding operations.

While the present invention has been described with reference to preferred embodiments, as will occur to those skilled in the art, numerous changes, omissions and additions can be made thereto without departing from the spirit and scope of the invention as set forth in the appended claims.

We claim:

1. A robotic welding equipment station to detect a deviation of a tool center point of a welding torch having an electric arc welding tip and a weld wire electrode projecting from the electric arc welding tip, the robotic welding equipment station comprising:

a first light emitting device to emit a first light beam and a first light detector positioned to detect the first light beam;

a second light emitting device to emit a second light beam and a second light detector positioned to detect the second light beam;

the first light emitting device and the first light detector oriented with respect to the second light emitting device and the second light detector such that the first light beam and the second light beam are at an angle to one another and the weld wire electrode is able to simultaneously pass through and interrupt both the first light beam and the second light beam to prevent the first light beam and the second light beam from being detected by the first light detector or the second light detector when there is no deviation in the tool center point;

the first light emitting device and the first light detector spaced apart from the second light emitting device and the second light detector such that the first light beam and the second light beam are spaced apart from one another at a distance along the tool center point vertical axis and the weld wire electrode is unable to simultaneously pass through and interrupt both the first light beam and the second light beam upon the deviation of the tool center point occasioned by a misalignment of the weld wire electrode propagating along the length the tool center point; and the first light detector configured to generate a first output signal when the first light beam is detected by the first light detector and the second light detector configured to generate a second output signal when the second light beam is detected by the second light detector, the first output signal and the second output signal capable of being received by means for detecting the deviation of the tool center point.

2. The robotic welding equipment station of claim 1, wherein:

the first light emitting device is located opposite to the first light detector;

the second light emitting device is located opposite to the second light detector; and each of the first light emitting device and the first light detector and the second light emitting device and the second light detector is formed by a fiber optic light emission device and a matched fiber optic extrinsic sensor.

3. The robotic welding equipment station of claim 2, wherein each of the fiber optic light emission device and the matched fiber optic extrinsic sensor employ fiber optic elements having a diameter of about 0.5 millimeters.

4. The robotic welding equipment station of claim 2 or claim 3, wherein:

the fiber optic light emission device and the matched fiber optic extrinsic sensor of each of the first light emitting device and the first light detector and the second light emitting device and the second light detector is mounted on a tube through which the weld wire electrode extends; and the tube is mounted within an enclosure having an end wall and an opening within the end wall aligned with the tube and able to receive a gas shroud of the welding torch.

5. The robotic welding equipment station of claim 4, wherein the first light emitting device and the first light detector is spaced apart from the second light emitting device and the second light detector such that the first light beam and the second light beam are spaced apart from one another at a distance of about 6.35 millimeters.

6. The robotic welding equipment station of claim 4, wherein the means for detecting deviation of the tool center point is a programmable computer used in controlling welding operations of the welding torch that is responsive to the first output signal and the second output signal and programmed to suspend the welding operations upon detecting the deviation in the tool center point of the welding torch and to display an indication thereof.

7. The robotic welding equipment station of claim 6, wherein the first light emitting device and the first light detector is spaced apart from the second light emitting device and the second light detector such that the first light beam and the second light beam are spaced apart from one another at a distance of about 6.35 millimeters.

8. The robotic welding equipment station of claim 1, wherein the first light emitting device and the first light detector are spaced apart from the second light emitting device and the second light detector such that the first light beam and the second light beam are spaced apart from one another at a distance of about 6.35 millimeters.

9. The robotic welding system robotic welding equipment station of claim 1, wherein the means for detecting deviation of the tool center point is a programmable computer used in controlling welding operations of the welding torch that is responsive to the first output signal and the second output signal and programmed to suspend the welding operations upon an detecting the deviation in the tool center point of the welding torch and to display an indication thereof.

10. A robotic welding system for detecting deviation from a tool center point by a weld wire electrode that projects from a welding tip of a welding torch, the robotic welding system comprising:
   a first light emitting device to emit a first light beam and a first light detector positioned to detect the first light beam;
   a second light emitting device to emit a second light beam and a second light detector positioned to detect the second light beam;
   the first light emitting device and the first light detector oriented with respect to the second light emitting device and the second light detector such that the first light beam and the second light beam are at an angle to one another and not on a single plane and the weld wire electrode is able to simultaneously interrupt both the first and the second light beams and prevent the same from being detected by the first and the second detectors when there is no deviation in the tool center point;
   the first light detector configured to generate a first output signal when the first light beam is detected by the first light detector and the second light detector configured to generate a second output signal when the second light beam is detected by the second light detector; and
   detecting deviation of the weld wire electrode from the tool center point when the first light beam or the second light beam activates the first light detector or the second light detector, respectively, thereby generating the first or second output signal.

11. The robotic welding system of claim 10 wherein each of the first light emitting device and the first light detector and the second light emitting device and the second light detector is formed by a fiber optic light emission device and a matched fiber optic extrinsic sensor.

12. The robotic welding system of claim 11 wherein the programmable computer is capable of suspending welding operations.

13. The robotic welding system of claim 10 wherein a programmable computer used in controlling welding operations of the welding torch is responsive to the first output signal and the second output signal, the programmable computer automatically responding to either or both of the first and second output signals.

14. The robotic welding system of claim 10 wherein the first light emitting device and the first light detector spaced apart from the second light emitting device and the second light detector such that the first light beam and the second light beam are spaced apart from one another at a distance of about 6.35 millimeters.

* * * * *